E. J. ANTONI.
COTTON CHOPPER.
APPLICATION FILED AUG. 28, 1920.

1,383,055.

Patented June 28, 1921.
5 SHEETS—SHEET 2.

INVENTOR
Ernst J. Antoni
BY
Rich N. Manning
ATTORNEY

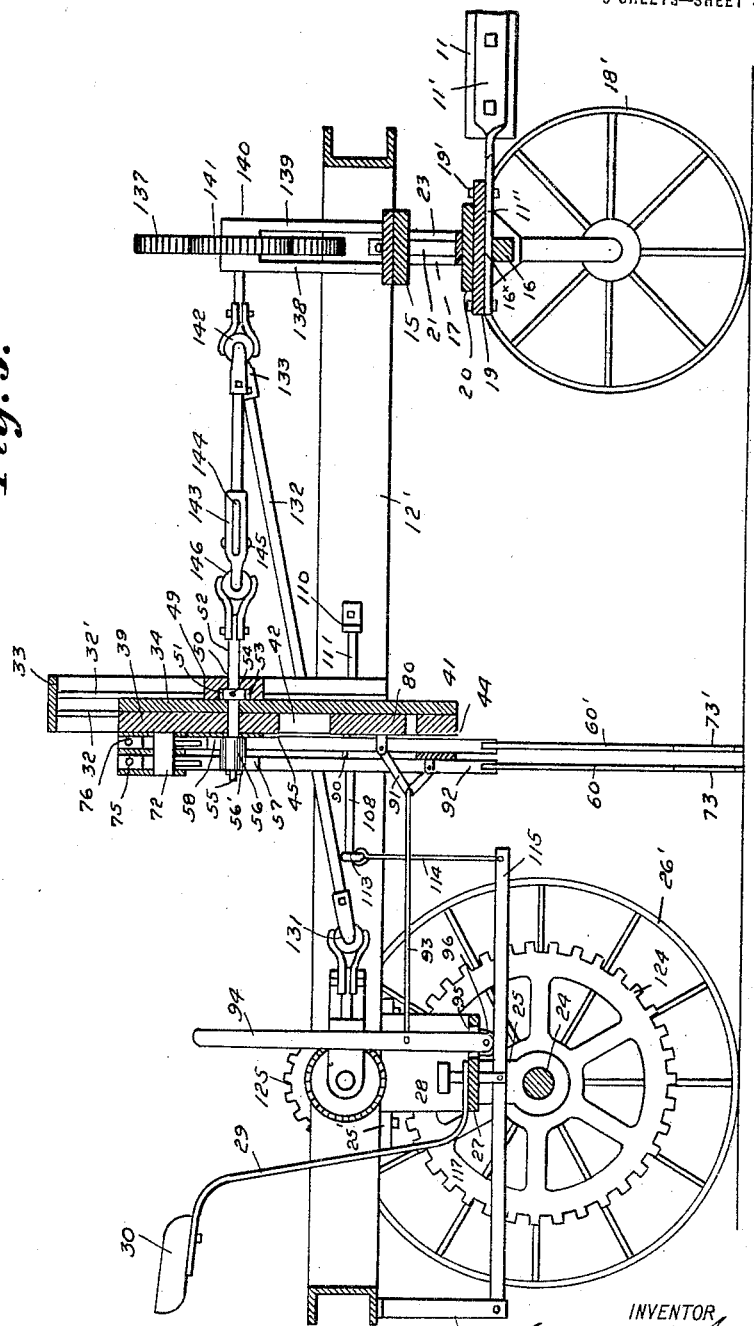

E. J. ANTONI.
COTTON CHOPPER.
APPLICATION FILED AUG. 28, 1920.
1,383,055.
Patented June 28, 1921.
5 SHEETS—SHEET 4.
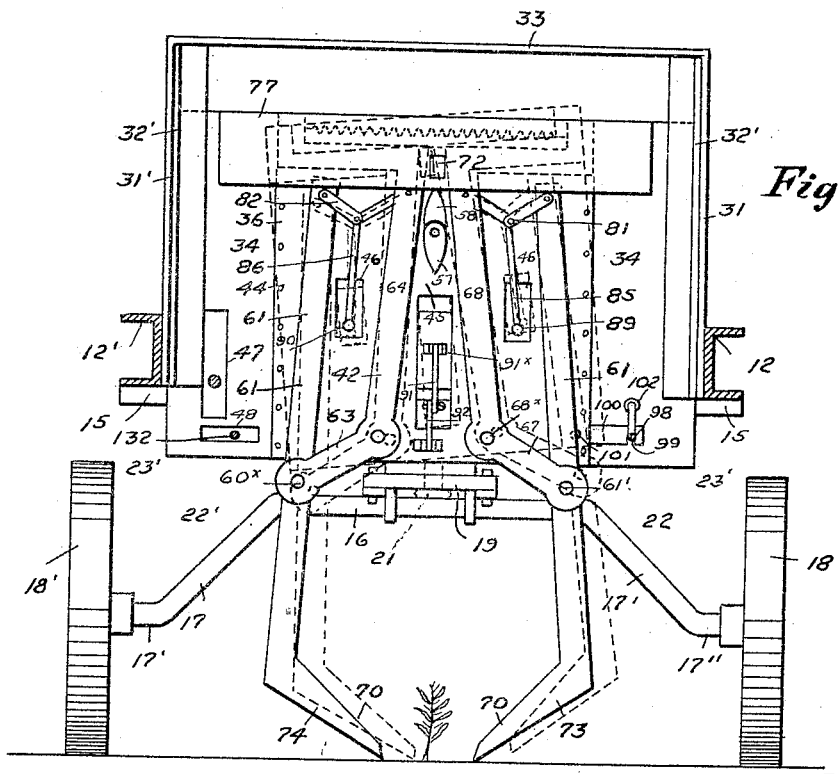
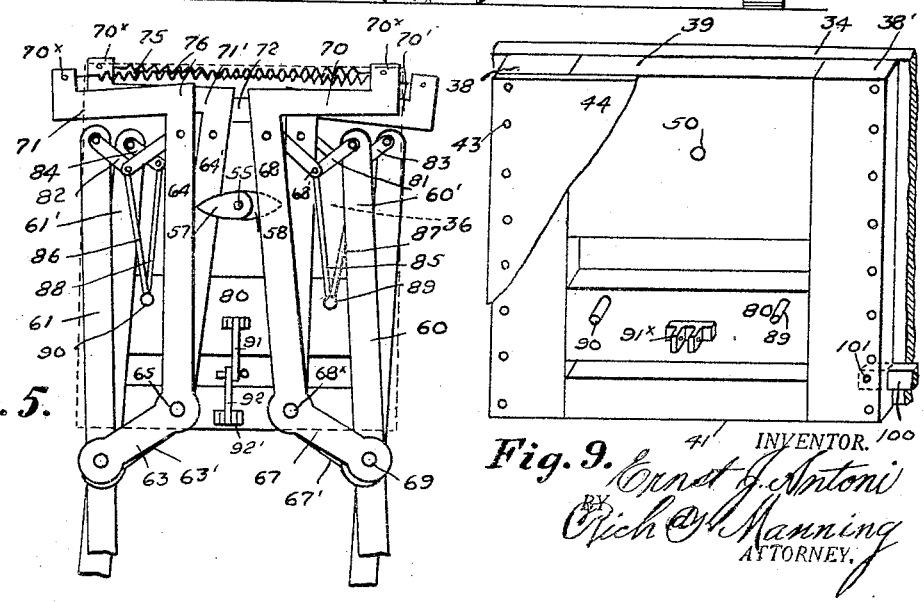

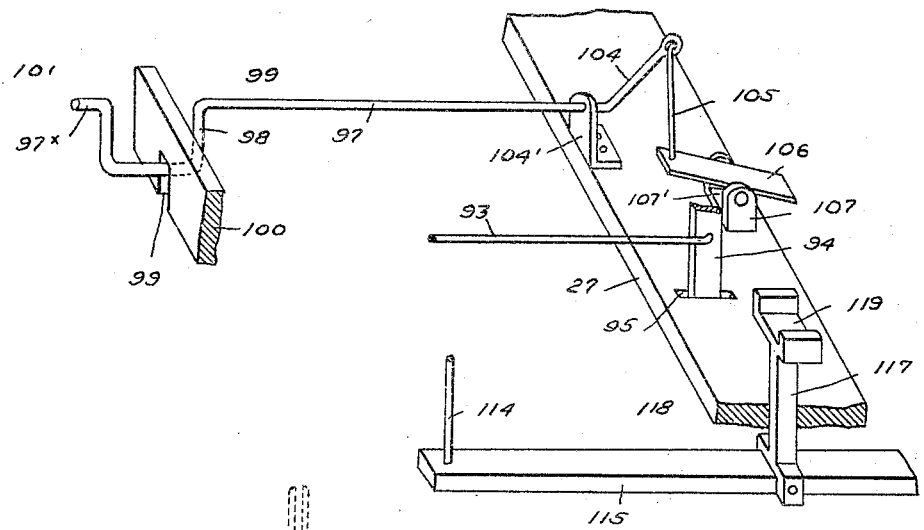
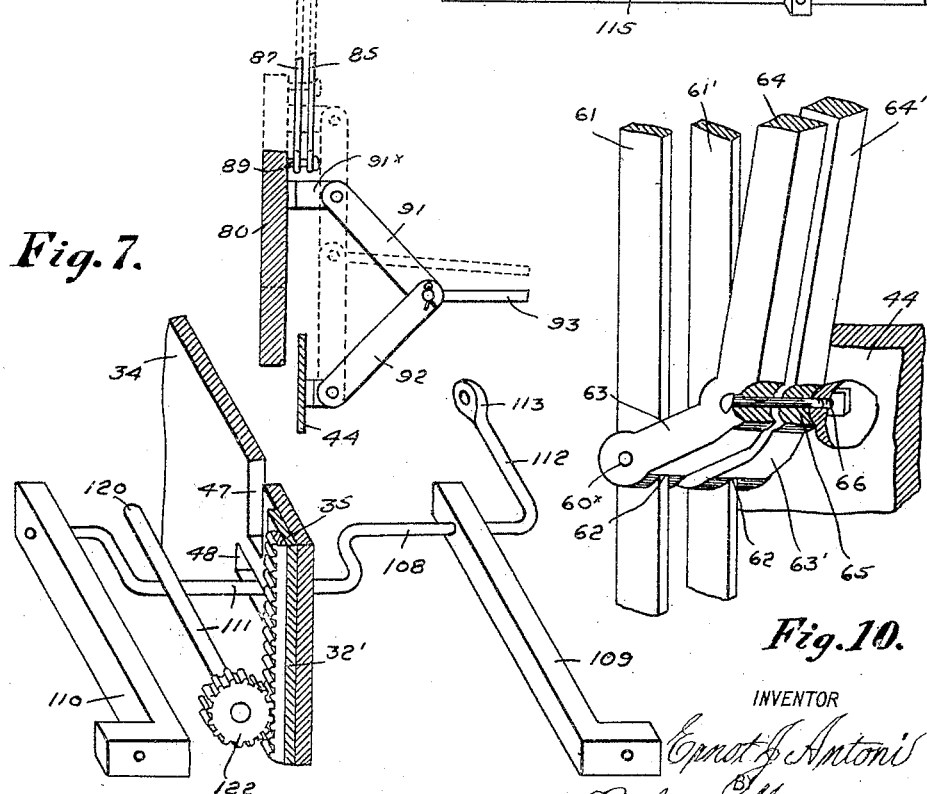

UNITED STATES PATENT OFFICE.

ERNST J. ANTONI, OF WHITEWRIGHT, TEXAS.

COTTON-CHOPPER.

1,383,055.   Specification of Letters Patent.   Patented June 28, 1921.

Application filed August 28, 1920. Serial No. 406,674.

*To all whom it may concern:*

Be it known that I, ERNST J. ANTONI, a citizen of the United States of America, residing at Whitewright, in the county of Grayson and State of Texas, have invented certain new and useful Improvements in Cotton-Choppers; and I do hereby declare that the following is a full, clear, and exact description of the invention, reference being had to the accompanying drawings, forming a part of this specification.

The principal object of the invention is to make effective the removal of the cotton plants at intervals from the plant rows upon undulatory surfaces or broken ground as well as upon level surfaces, and also govern the chopping to the depth of the plant roots.

Second, to enable the choppers to be kept in line with the plant rows, in a divergence of the machine from a direct course of movement.

Third, to effect alternate chopping movements of the oppositely positioned choppers, thereby permitting the spacing of the plants which are left in the removal of the plants by the action of the choppers.

Fourth, to regulate the distance apart of the choppers, so that selected plants may be left standing and the chopping resumed in the center of the row.

Fifth, to effect a concerted action of the chopper raising and lowering, rocking and spacing movements, and Sixth, to regulate the chopping to the speed maintained by the machine.

The invention consists in the novel construction and combination of parts, which will be first fully described and then specifically pointed out in the claims.

In the drawings,

Fig. 3 is a longitudinal vertical sectional view taken on the line 3—3 on Fig. 2, the position of the ends of the machine being reversed, the view being toward the left hand side of the machine, as in Figs. 1 and 2, the choppers and chopper supporting frame being lowered in position.

Fig. 4 is a transverse, vertical, sectional view of the machine, taken on the line 4—4 on Fig. 2 immediately forward of and looking toward the chopper supporting frame, showing the rocking positions of the chopper supporting frame in dotted lines.

Fig. 5 is a detail front view of the chopper supporting rocking frame, and choppers, showing the alternate positions of the forward and rear chopper operating levers during the rotary movements of the cams on the cam shaft, upon which shaft the frame supporting the levers obtains a rocking movement, the choppers being broken away.

Figure 1:
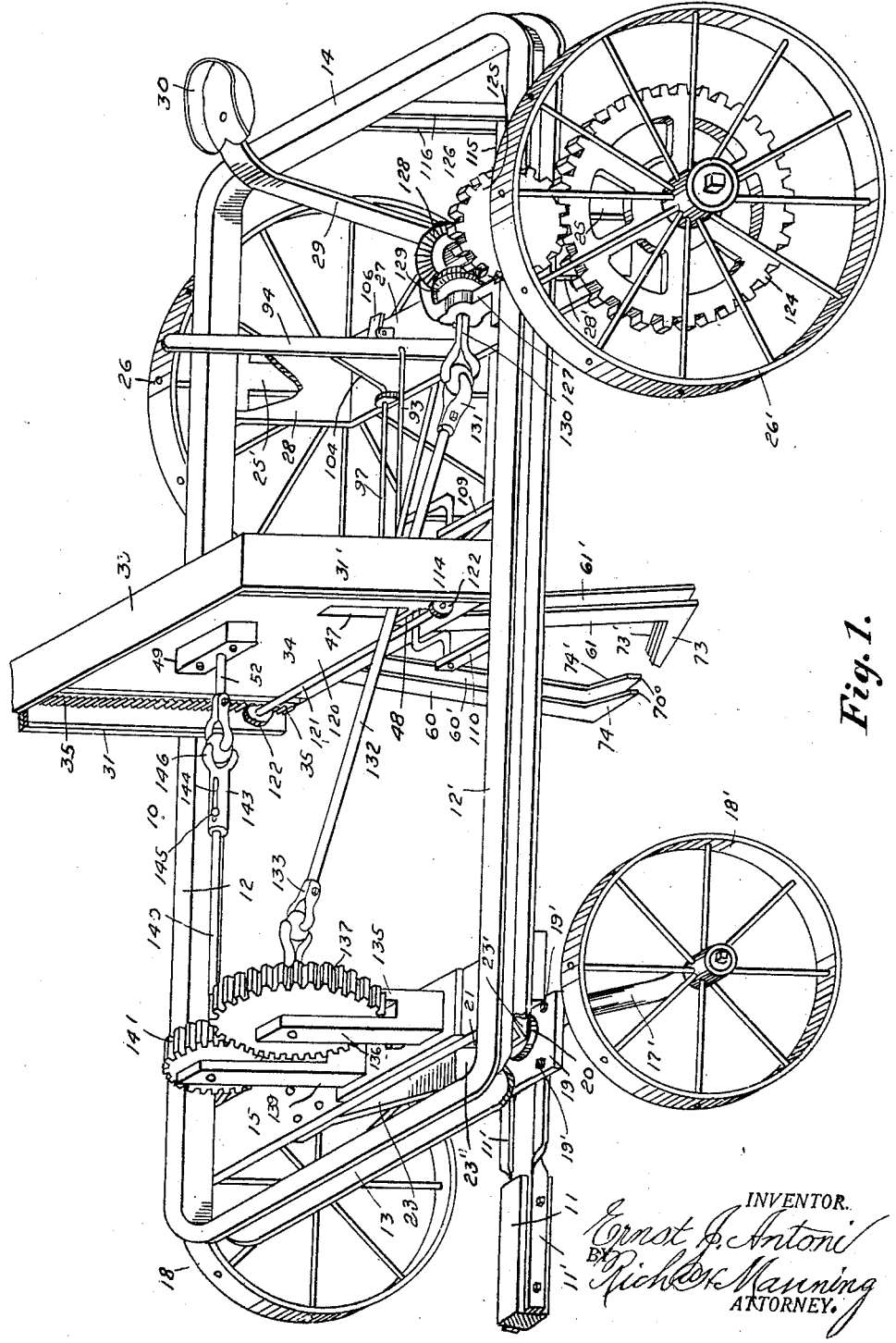
Figure 1 is a perspective view of the novel cotton chopping machine, showing the choppers in their normal elevated position above level ground.

Fig. 6, is a detail view in perspective of the seat supporting cross beam on the forward end of the frame of the machine showing a portion of the pivoted bar on the rocking frame, and the rocking crank rod connections and foot lever, also showing a portion of the lever operating the lever spacing devices, and the foot operated lever actuating the raising an lowering of the chopper supporting sliding plate.

Fig. 7, is a detail side view of the toggle lever and rod actuating the spacing apart of the chopper carrying levers, and Fig. 8, is a detail view in perspective of a portion of the vertically movable sliding plate, showing the guide rack and a portion of the guide rod and the cogwheel engaging with the rack, also showing the crank arm operating the sliding plate and the arm supporting bars on the frame of the machine.

Fig. 9, is a detail perspective view of the oscillating frame with the face plate broken away; and Fig. 10, is a detail view of the pivoted levers and adjusting pivoted supporting bars.

Similar numerals of reference indicate corresponding parts in all the figures of the drawings.

The machine hereinafter described for chopping the cotton plants in the field, is mounted upon a four wheeled vehicle 10, the vehicle being drawn by animal power or the power from a traction engine coupled to the draft pole 11.

The body of the vehicle consists of a rectangular frame, composed of parallel channel beams 12 and 12′, upon the respective right and left hand sides of the vehicle, with the forward ends of which beam are connected integrally the ends of the forward end channel beam 13, and with their rear ends is connected integrally the ends of the rear end beam 14.

With the lower surfaces of the channel beams 12 and 12', a short distance rearwardly from the line of the forward end beam 13, is secured rigidly the ends of a transverse beam 15. The forward axle supporting the forward end of the body of the vehicle consists of a short squared portion 16, directly beneath the transverse beam 15, from the ends of which portion extend outwardly and downwardly bent portions 17—17', their lower ends being bent outwardly and horizontally at 17''—17', upon which latter portions are mounted the wheels 18—18' respectively. See Fig. 4. Upon the upper surface of the squared portion 16 of the front axle, is mounted a transverse center plate 19, to which is bolted, by bolts 19', the inward twisted extensions 11'' of the separate draft bars 11' which are bolted to the opposite sides and rear end of the draft pole 11, these bars extending within depressions 16$^x$, beneath plate 19 in the upper portion of the axle.

Upon the upper surface of plate 19, is a circular flat plate or fifth wheel 20, through the center of which plate 20, and the plate 19 passes the kingbolt 21. See Figs. 3 and 4. Flat bars 23—23' are bolted to the opposite portions and lower surface of the transverse beam 15, on the body of the vehicle at their upper ends, the lower portions of which bars extend downwardly and are inclined inwardly and are integral with each other and bear upon the fifth wheel 20 on the plate 19, through which integral portion of the bars 23—23' the kingbolt extends, the said bars 23—23' affording a rigid support to the body of the vehicle.

The rear axle 24 is a straight shaft and is journaled in the lower end portions of the flanges or bars 25—25'. These bars are provided with inwardly extended flanges 25'' at their upper ends, which flanges are bolted to the lower flanges of the channel beams 12—12', in a vertical line with the outer edges of said flanges and at a point on said beam approximately one-fifth the distance forwardly of the line of the rear end beam 14.

Upon the outer ends of the shaft or axle 24, are mounted fixedly the rear wheels 26—26', which are about one-third larger in circumference than that of the forward wheels 18—18'.

A short distance above and in line with shaft or axle 24, is a beam 27, with the outer ends of which beam are connected the lower ends of the supporting plates 28—28', the upper ends of which plates are connected with channel beams 12—12'. With the upper surface of beam 27, at a point equi-distant from its ends, is connected rigidly the lower end of the seat supporting standard 29, upon the upper end of which is the seat 30 for the operator, its position being such as to facilitate the conjoint movement of both feet and the hands in the operation of the machine, as further described.

The plant chopper supporting and governing devices are located approximately intermediate the forward and rear ends of the body of the vehicle and consist of vertical guide plates 31—31' connected at their lower ends rigidly with the inner surfaces of the channel beams 12—12' of the body of the vehicle. On the inner surface of these guide plates are vertical guide angle bars, 32—32', see Fig. 2, spaced equi-distantly apart from each other and the outer vertical edge portions of each guide plate.

With the upper ends of the guide plates 31—31' are connected rigidly the respective ends of a transverse connecting plate 33.

Between the guide bars 32—32' is slidably arranged the outer ends of a vertically movable plate 34, approximately the same height as that of the guide plates 31—31'.

Upon the outer surface of the guide bars 32—32', are secured fixedly the toothed bars or racks 35, see Fig. 8.

Upon the rear surface of the plate 34, is an oscillating suspensory frame 36. This frame extends from the line of the upper to the line of the lower surface of the plate 34, and is about two-thirds its width.

As constructed, the oscillating suspensory frame 36 consists of vertical bars 38—38' of the same thickness. Between the bars 38—38', is a face board 39 connected fixedly with the bars 38—38', its ends extending to and in close contact with the inner surfaces of the respective bars 38—38'. The lower portion of this face board extends downwardly about one-half the distance from the line of the upper surface to the line of the lower surface of the frame and at the lower portion of the frame is a transverse bar 41, of the same thickness as the bars 38—38' above the upper surface of which bar, and the lower surface of the face board 39, is a wide space 42 for the purpose further described.

Upon the outer surface of the bars 38—38' and the face board or plate 39, is secured by the nails 43 a thin metal face plate 44, see Fig. 9. In the lower portion of the face plate 44, intermediate the vertical lines of the inner surfaces of cleats 38—38', is a vertical opening 45, extending downwardly to the line of the upper surface of bar 41.

Between said inner lines of the bars 38—38' and the vertical opening 45, are the vertical openings 46—46'. In the plate 34 in the lower portion and left hand side, is a vertical opening 47 which extends upwardly a considerable distance, and below said opening is a horizontal opening 48 for the purposes hereinafter described.

Upon the forward surface and upper portion of the plate 34, is a casting 49, secured fixedly thereto, and at a point intermediate the end portions of the said plate 34 through which end the respective boards 37 and 39 and the face plate 44 of the frame 36 extends a shaft opening 50. Within the casting and extending around the opening 50, is a recess 51.

Extending through said shaft opening 50, is a rotary shaft 52, short in length, upon which shaft in the recess 51 is a collar 53 secured to the shaft by a pin 54.

The end 55 of shaft 52 extending through the board 39 and face plate 44 of the frame 36, is reduced in circumference and squared and upon said squared end of the shaft is fitted a casting or hub 56 secured by a cotter pin 56′, from the forward end portion of which hub extends a cam 57, and from the rear portion of the hub extends a cam 58, these cams extending in an opposite direction to each other. The shaft 52 forms the support for the frame 36 upon the plate 34, and upon which shaft the frame 36 is afforded an oscillating or rocking movement.

The plant chopping mechanism consists of a series of vertical levers or bars 60—60′, 61—61′, arranged in position in pairs, the pairs being located near the outer vertical portions and in rear of the oscillating frame 36. These bars 61—61′, which are opposite the left hand side of frame, are pivoted by pivots 60$^x$ at a point a little more than one-half the distance from their upper to their lower ends within the notches 62—62′ in the outer ends of the respective forward and rear and outwardly and downwardly inclined lower ends 63—63′, of the upwardly extending lever operating bars 64—64′, see Fig. 10. Both bars 64, 64′, are pivoted for independent action upon the pivot bolt 65, which passes through the lower portions of said bars at the angle formed by the outwardly inclined extensions 63—63′, the inner end of the pivot bolt being screw-threaded and extended through the face plate 44 on the oscillating frame 36 at a point about one-third the distance inwardly from the right hand outer edge portion of said frame immediately above the bar 41 and is secured to a nut 66 in rear of said face plate 44, see Fig. 10.

The levers 60—60′, which are opposite the right hand side of the oscillating frame 36, are pivoted at 69′ within the notches in the outwardly and downwardly inclined lower ends 67—67′ of the upwardly extended lever operating bars 68—68′, which are precisely the same as the bars 64—64′. These bars 68—68′ are pivoted upon a pivot bolt 68$^x$ extending through the face plate 44 of the oscillating frame 36, about one-third the distance inwardly from the right hand portion of the said frame 36 and secured in precisely the same manner to said frame as described of pivot bolt 65 supporting the bars 64—64′, as seen in Fig. 10.

The upper end of the respective pairs of bars 60—60′, 61—61′ extends upwardly past the cams 57 and 58 to within a short distance of the line of the upper surface of the frame 63 and portions 70—70′ of bars 60—60′, extended outwardly at right angles in one direction and the portions 71—71′ of the bars 61—61′ extended outwardly at right angles in the opposite directions to the lines of the vertical surfaces of the oscillating frame at which point short portion 70$^x$ of the respective ends of the portions 70—70′, 71—71′ are extended upwardly a short distance. The inner surfaces of the bars 64—64′, 68—68′ are in position to be operated alternately upon by the outer ends of the respective cams 57 and 58. A block 72 is secured to the face plate 44 of the oscillating frame between the upper ends of bars 64—64′, 68—68′ which receive the inward thrust of said bars and retain them in an operative position.

The lower ends of the respective levers 60—60′, 61—61′, extend downwardly in the direction of the ground and the lower portions 73—73′ of levers 60—60′ inclined downwardly and inwardly, and also the portions 74—74′ of the levers 61—61′, to form plant picks, the upper surfaces of these portions of these picks being inclined downwardly nearly to a point as at 70°, these picks being adapted to enter the ground at an angle and to the depth governed by the rise and fall of the plate 34.

With the upper extension 70$^x$ of the outwardly extended portions 70 and 71 of bars 64 and 68, are connected the ends of a coiled spring 75, and with like portions of the extensions 70′ and 71′ are connected the ends of a coiled spring 76. The said outward extensions 70—70′ and 71—71′ are guided in the inward and outward movements of the upper ends of levers 60—60′, 61—61′, within the separate spaces between the outer and inner guide plates 77 and 78, separated by the blocks 79, at each end these plates being secured to the upper end portion of the oscillating frame 36 and to the face plate 44 on said frame, through which plates the block 72 extends.

The adjusting devices for spacing the picks 73—73′ and 74—74′ the desired distance apart in their chopping movements, consist of a vertically movable block 80 in the space 42 between the side plates 38—38′ and the face plate 44 of the oscillating frame 36. With the upper end of the levers 60 and 61 and also the upper end portions of the adjusting bars 68 and 64 respectively, are pivotally connected the toggle joints 81 and 82 respectively, and with the upper ends of the levers 61—61′ and upper end portions of bars 68—68′ and 64—64′, are pivotally connected the toggle joints or levers 83 and 84 respectively. Operating rods 85 and 86 are pivotally connected at their upper ends with the respective toggle joints 81 and 83 respectively, and operating rods 87 and 88 are pivotally connected at their upper ends to the respective toggle joints 83 and 84 respectively.

The lower ends of the rods 85 and 87 are pivotally connected at their lower ends with a pin 89, which are rigidly connected with one end of the vertically movable block 80 and which extend outwardly through the opening 46 in the face plate 44 of the oscillating frame 36, and the lower end of the rods 86 and 88 are pivotally connected with the pin 90 on the other end of said block 80 and which extend outwardly through the opening 46′ in said face plate 44.

The block 80 is operated by toggle jointed levers 91 and 92, the upper ends of the lever 91 being pivoted to lugs 91$^x$ on block 80 and which extends outwardly through the vertical opening 45 in the face plate 44 of the oscillating frame, the lever 92 being pivoted to lugs on face plate 44 below the opening 45, as seen in Figs. 4 and 5.

Figure 2:
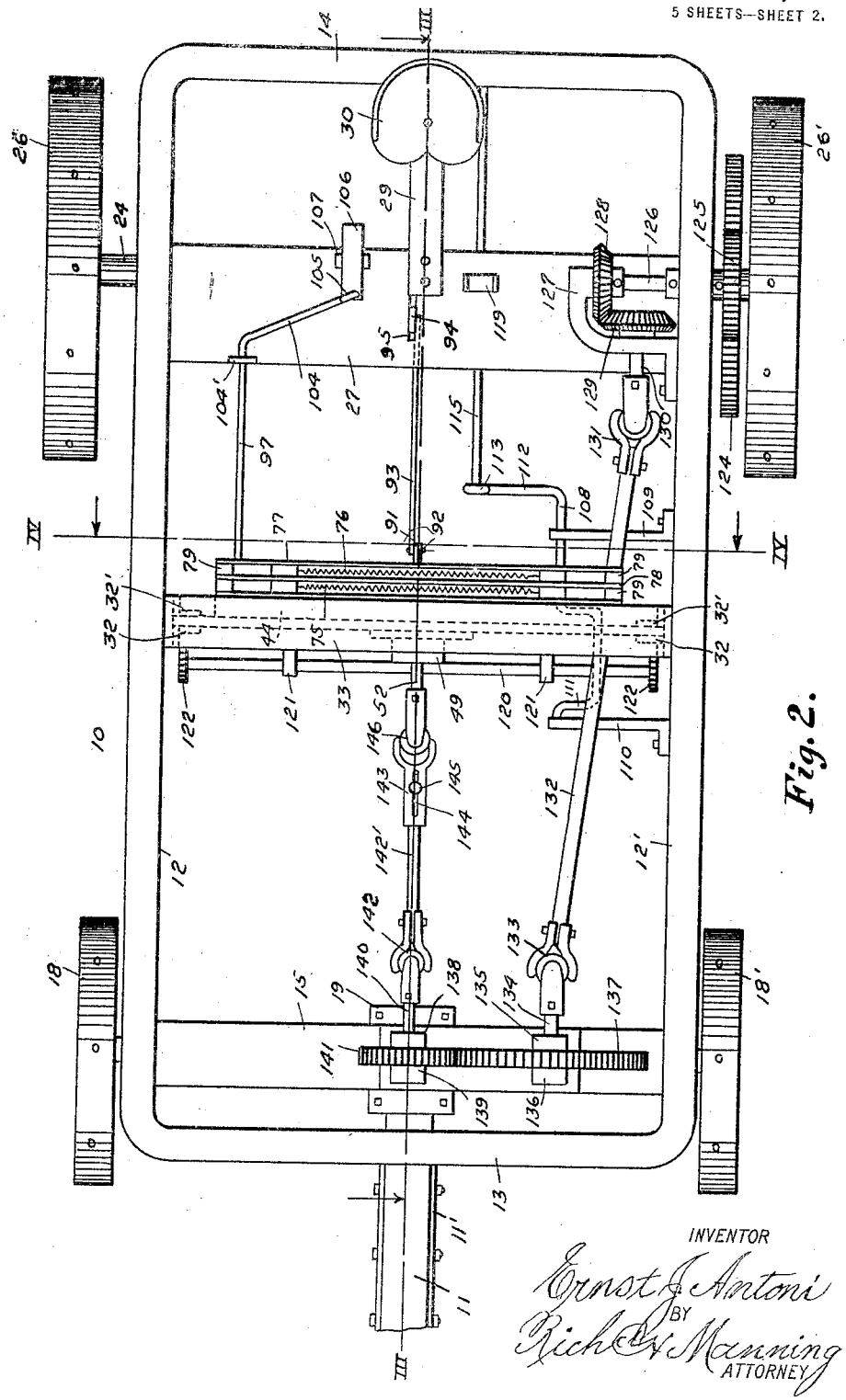
Fig. 2 is a plan view of the invention as seen in Fig. 1.

With the toggle levers 91 and 92, is pivotally connected the forward end of an operating rod 93, see Figs. 2 and 7, the rear end of which lever extends horizontally rearwardly to a position above the transverse beam 27 and is pivotally connected to one side of a vertical operating lever 94, at a point the requisite distance above the beam 27, the lower end of the lever 94 extending downwardly through a transverse opening 95 in said beam 27, and is pivotally connected with a lug 96 on the lower surface of said beam.

The means for oscillating the frame 36, consists of an operating rod 97 which is provided with a U shaped crank arm 98, near the outer end of said rod, which crank extends upwardly within the notch 99 in the lower portion of a pivoted bar 100, the outer end 97$^x$ of the rod past said crank arm entering an opening 102 in the vertically movable plate 34, see Fig. 4. The outer end of the rod 97 is journaled in an upright bar 104′ on beam 27, then bent upwardly to form a crank arm 104, and with the outer end of said arm is pivotally connected the upper end of a rod 105, the lower end of which lever is pivotally connected with the forward end of a foot operated lever 106, which lever is pivoted between its ends to upright lugs 107 on the plate 107′ secured to the upper surface of its beam 27 to the right of the support 29 for the seat 30.

The means for raising and lowering the plate 34 consists of a crank shaft 108 journaled at its ends in the outer ends of the bars 109, 110, secured at their inner ends to the inner surface of the channel beam 12′ on the left hand side of the frame of the body 10 and which extend forward and rear respectively of the left hand portions of the said plate 34.

Between these bars a U shaped crank arm 111 is formed on the crank shaft 108, which enters the horizontal opening 48 in lower left hand portion of the plate 34.

The forward portion of the crank shaft 108 is bent at right angles immediately forward of the supporting bar 109, and a portion 112 extended inwardly a short distance and provided with a loop 113 at its outer end. With this loop is connected pivotally the upper end of a rod 114 (see Fig. 3), the lower end of which rod is pivotally connected with the forward end of a long lever bar 115, the rear end of which bar extends beneath beam 27 and rearwardly to a position beneath the rear transverse end member of the frame or body 10, and is pivotally secured to the lower ends of the downwardly extended supporting bars 116, the upper ends of which bars are rigidly connected with the lower surface of said end member.

A foot lever 117 extends through an opening 118 in the beam 27, its upper end having a fixed stirrup 119 for the foot of the operator, the lower end of the lever being forked and the forked portions pivotally connected with the long lever bar 115.

In order to guide the plate 34 in its upward and downward movements a rod 120 is mounted rotatably in the brackets 121 on the lower rear portion of plate 34, in the outer ends of which rod are toothed wheels 122 which engage with the racks 35 on the guide plates 32, 32′, on the uprights 31—31′, see Fig. 8.

The power to operate the machine is communicated from a large cog wheel 124, mounted on the rear axle 24, between the wheel 26′ and the hanger 25.

Engaging with this cog wheel, is a small cog wheel 125 mounted on the outer end of a short shaft 126 journaled in the side of the channel beam 12′ between its upper and lower flanges. The inner end of shaft 126 is journaled in the outer curved end of a bracket 127 secured to the inner side of the channel beam 12′, and upon said shaft is a bevel gear 128. This gear 128 meshes with a bevel gear 129, the shaft 130 supporting which gear extends through the portion of the bracket at right angles to the shaft 126. Upon the forward portion of shaft 130 is a universal joint 131, and with said joint is connected the rear end of a rotary shaft 132, which extends forwardly through the vertical opening 47 in the plate 34 and thence to a position above the plane of the forward transverse beam 15 and upon said end is a universal joint 133. The joint 133 is connected with a short shaft 134 journaled in the upper ends of standards 135 and 136, which are mounted fixedly on the beam 15 about one-fourth the distance on said beam from the side channel beam 12' toward the side beam 12. Upon shaft 134 is a large gear wheel 137.

Upon the beam 15 to the right of the standards 135 and 136, are standards 138—139, in the upper ends of which is journaled the end of a rotary shaft 140 upon which shaft is mounted a small gear 141 which meshes with the large gear 137.

Upon the forward end of shaft 140 is a universal joint 142 and with this joint is connected the forward end of a power transmitting rotary shaft 142' which extends in the direction of the shaft 52 operating the cams 57 and 58, and also extends within a socket 143 provided with a longitudinal slot 144 through which slot extends a pin 145, which is connected with the shaft 142' permitting a sliding movement of said shaft within the socket 143.

With the rear end of socket 143 is connected a universal joint 146, which is also connected with said rotary shaft 52, carrying the cams 57 and 58.

In operation, power is applied to the draft beam 11 to draw the vehicle forward in the field in which the cotton plants extend in rows, these rows being the usual distance for weeding out the plants and gathering the cotton from the bolls. The power thus applied, imparts rotation to the wheels 18—18' and 26—26', and the draft power on wheel 26 is transmitted through the gear wheel 125 to the bevel gear 128 and 129, thence through shaft 132 to the large gear wheel 137, thence to the small gear 141, thence to the rotary shafts 142' and 52, and the cams 57 and 58 on the latter shaft are given rapid rotation and the operating bars 64—64', 68—68', move inwardly and outwardly, each pair alternately, causing a corresponding movement of the levers 60—60', 61—61', and the picks 73—73', 74—74'. The picks now being ready for chopping out the plants from the rows, and, as seen in Fig. 1, elevated, the various functions are as follows:—

The operator seated in the seat 30, places the right foot on the foot lever 106, and the left foot in the stirrup 119 on lever 117, at the same time grasping the upright lever 94 with one hand.

The weight of the plate 34 and the pick operating mechanism is now under control of the foot operated lever 117, and sufficient pressure is applied upon the stirrup 119 to give the proper depth of pick action to the picks.

As the vehicle moves in the direction of the rows, the picks may require closer action to chop out intervening rows of plants, in which case the lever 94 is moved forwardly to force inwardly the toggle jointed levers 91 and 92, which action forces upwardly the block 80 thereby forcing upwardly the toggle joints 81 and 82 and moving the upper ends of levers 60—60', 61—61', outwardly and the picks thereby are drawn closer together. It is observed that the rows of cotton plants may vary from straight lines and hence it becomes necessary to move the picks from right to left to keep the picks in position as the lines of the rows diverge from straight lines. To accomplish this movement, foot pressure is applied to the foot lever 106, which rocks the shaft 97 and communicates through the crank 98 an oscillating movement to the frame 36, and moving the picks toward the line of direction of the plants.

All of these operations may be simultaneous, compelling the operator to closely observe the lines of direction of the plants and the action of the picks.

Whenever the vehicle passes to a high elevation from a lower, the lever 117 is operated to raise the plate 34 and elevate the picks, which action may occur frequently without stopping the vehicle.

The cam operated bars being always under tension of the springs 75 and 76, all shocks to the picks in their chopping action are eliminated, and the leverage on the picks made uniform.

Such modifications of the invention may be employed as are within the scope of the appended claims.

Having fully described my invention, what I now claim as new and desire to secure by Letters Patent, is—

1. In cotton choppers, the combination with the main frame and the supporting wheels, of a rotary shaft, suspensory devices on said frame and separate adjusting bars having outwardly and downwardly inclined lower end portions pivoted to said suspensory devices, and bars pivoted thereto, and plant choppers on said bars, adjustable connecting devices for the separate adjusting bars connected with the bars carrying the plant choppers, coiled springs connected with the upper ends of said bars carrying the plant choppers, and cams on the rotary shaft actuating the said adjusting bars.

2. In cotton choppers, the combination with the main frame and the supporting wheels, of suspensory devices on said frame, raising and lowering devices actuating the suspensory devices, a rotary shaft carried by the suspensory devices, and opposite adjustable bars having outwardly and downwardly inclined lower end portions pivoted to said suspensory devices, and separate bars pivoted to said downwardly inclined ends of the adjustable bars, plant choppers on the lower ends of the latter bars, and coiled springs connecting the upper ends of the respective bars carrying the plant choppers, and means for adjusting the adjustable bars in connection with the bars carrying the plant choppers, and cams on the rotary shaft adapted to come into contact with the adjustable bars.

3. The combination in plant choppers with separate plant chopping devices, and with means for communicating a chopping movement to said devices, of mechanism co-acting to space apart said chopping devices one from the other.

4. The combination in plant choppers, with separate plant chopping devices, and with means for communicating a plant chopping movement to said devices, of levers connecting one of said chopping devices with another, and means for operating said levers simultaneously.

5. The combination in plant choppers, with separate plant chopping devices, and with spacing means for spacing said devices the proper distance apart, of means co-acting to govern the spacing movement.

6. The combination in plant choppers, with suitable suspensory devices, and upright adjusting bars having lateral extensions at their lower end pivotally connected with said suspensory devices, and with vertical bars pivoted to said lateral extensions, and plant choppers connected with said latter bars, of toggle levers connecting the adjusting bars with the bars supporting the plant choppers.

7. In plant choppers, the combination with the main frame and the supporting wheels, of oscillating suspensory devices supported by said frame, separate adjusting bars having outward extensions at their lower ends pivotally connected with the suspensory devices, and separate bars pivoted to said outward extensions of the adjusting bars and plant choppers thereon, adjusting devices connecting the respective adjusting bars with the bars supporting the plant choppers, means for oscillating the suspension devices, and acting to adjust the adjusting and plant supporting bars the requisite distance apart, while the suspensory devices are being oscillated.

8. In plant choppers, the combination with the main frame and the supporting wheels, of standards on said frame, and guiding devices on said standards, a vertically sliding plate supporting the plant choppers within said guiding devices, a rotary shaft journaled in said sliding plate, and means for transmitting motion to said shaft, an oscillating frame suspended upon said shaft having an opening, and a vertically movable device in said opening, and a toggle lever connected with said device and said frame, pivoted plant choppers carried by said frame, adjusting devices for the plant choppers, means for oscillating said frame and means for operating the toggle levers.

9. A cotton chopping machine, comprising a main frame and supporting wheels, standards connected with said frame having guiding devices, and a vertically movable sliding plate between said standards, a rotary shaft journaled in the upper portion of said sliding plate, and an oscillating frame mounted on said shaft having an opening and a block movable in said opening, adjusting bars having outwardly and downwardly inclined lower ends pivoted to said frame, and bars pivoted to said inclined ends of the former bars, and plant choppers on the latter bars, coiled springs connecting said latter bars with each other, and toggle adjusting levers connecting the bars carrying the plant choppers with the adjusting bars, and rods connecting the toggle levers with the movable block in said oscillating frame, and a block on said frame separating the upper ends of said adjusting bars, a toggle lever connected with said movable block and said frame, and a hand lever, and a connecting rod connected therewith and with said toggle lever, a rock shaft and a crank arm and hand lever operating said oscillating frame, and a rock shaft and crank arm and lever operating to move the sliding plate in its vertical movements, and power operated devices on the frame of the machine communicating rotary motion to the rotary shaft on said sliding plate.

ERNST J. ANTONI.